United States Patent
Hyun

(10) Patent No.: US 9,980,235 B2
(45) Date of Patent: *May 22, 2018

(54) INFORMATION PROCESSING APPARATUS AND CONTROL METHOD THEREOF

(71) Applicant: Samsung Electronics Co., Ltd., Suwon-si, Gyeonggi-do (KR)

(72) Inventor: Do-won Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/239,290

(22) Filed: Aug. 17, 2016

(65) Prior Publication Data

US 2016/0360494 A1 Dec. 8, 2016

Related U.S. Application Data

(63) Continuation of application No. 14/464,009, filed on Aug. 20, 2014, now Pat. No. 9,432,952.

(30) Foreign Application Priority Data

Sep. 2, 2013 (KR) .................. 10-2013-0104980

(51) Int. Cl.
*H04B 7/00* (2006.01)
*H04W 52/24* (2009.01)
(Continued)

(52) U.S. Cl.
CPC ........ *H04W 52/245* (2013.01); *H04B 17/318* (2015.01); *H04W 52/267* (2013.01);
(Continued)

(58) Field of Classification Search
USPC ..... 455/522, 69–70, 450, 451, 452.1, 452.2, 455/41.1–41.3
See application file for complete search history.

(56) References Cited

U.S. PATENT DOCUMENTS

| 6,396,531 B1 * | 5/2002 | Gerszberg | ........... H04M 1/2535 348/14.01 |
| 7,227,847 B2 * | 6/2007 | Gluck | ................... G06F 1/3278 370/311 |

(Continued)

FOREIGN PATENT DOCUMENTS

KR 10-2012-0044463 A 5/2012

OTHER PUBLICATIONS

Hyun; An Application-Aware Adaptive Transmission Power Control for Wireless Networks; Samsung Best Paper Award 2013; Korea.

*Primary Examiner* — Fayyaz Alam
(74) *Attorney, Agent, or Firm* — Jefferson IP Law, LLP

(57) ABSTRACT

An information processing apparatus is provided. The information processing apparatus includes a communication interface configured to perform a wireless communication with an external apparatus and to transmit data to the external apparatus, and a controller configured to calculate a required bandwidth of a wireless communication as required by at least one application and to adjust a transmission power of the communication interface based on the calculated required bandwidth, when the at least one application is determined to be executed.

20 Claims, 11 Drawing Sheets

(51) Int. Cl.
*H04W 52/26* (2009.01)
*H04W 52/38* (2009.01)
*H04B 17/318* (2015.01)
*H04W 52/32* (2009.01)
*H04W 72/04* (2009.01)

(52) U.S. Cl.
CPC ....... *H04W 52/327* (2013.01); *H04W 52/383* (2013.01); *H04W 72/0453* (2013.01); *H04W 72/0473* (2013.01)

(56) References Cited

U.S. PATENT DOCUMENTS

| | | | |
|---|---|---|---|
| 7,423,970 B2 | 9/2008 | Wang et al. | |
| 8,068,875 B2* | 11/2011 | Nagai | H04W 72/082 370/200 |
| 2005/0201291 A1* | 9/2005 | Gluck | G06F 1/3278 370/241 |
| 2007/0105581 A1* | 5/2007 | Ariyur | H04W 52/343 455/522 |
| 2012/0140623 A1* | 6/2012 | Song | H04W 72/0486 370/230.1 |

* cited by examiner

FIG. 4

| MCS RATE INDEX | MODULATION TYPE | CODING RATE | DATA RATE (Mbps) | RECEPTION POWER (dbm) |
|---|---|---|---|---|
| 0 | BPSK | 1/2 | 15 | -79 |
| 1 | QPSK | 1/2 | 30 | -76 |
| 2 | QPSK | 3/4 | 45 | -74 |
| 3 | 16-QAM | 1/2 | 60 | -71 |
| 4 | 16-QAM | 3/4 | 90 | -67 |
| 5 | 64-QAM | 2/3 | 120 | -63 |
| 6 | 64-QAM | 3/4 | 135 | -62 |
| 7 | 64-QAM | 5/6 | 150 | -61 |

FIG. 5

| MCS RATE INDEX | TOTAL REQUIRED DATA RATE | RECEPTION POWER |
|---|---|---|
| 0 | $B_{rate} \leq 15$ | $-79 \leq RSSI < -76$ |
| 1 | $15 < B_{rate} \leq 30$ | $-76 \leq RSSI < -74$ |
| 2 | $30 < B_{rate} \leq 45$ | $-74 \leq RSSI < -71$ |
| 3 | $45 < B_{rate} \leq 60$ | $-71 \leq RSSI < -67$ |
| 4 | $60 < B_{rate} \leq 90$ | $-67 \leq RSSI < -63$ |
| 5 | $90 < B_{rate} \leq 120$ | $-63 \leq RSSI < -62$ |
| 6 | $120 < B_{rate} \leq 135$ | $-62 \leq RSSI < -61$ |
| 7 | $135 < B_{rate} \leq 150$ | $-61 \leq RSSI$ |

FIG. 7

| DISTANCE (m) | RELATED ART TRANSMISSION POWER(mW) | PRESENT EMBODIMENT TRANSMISSION POWER(mW) | REDUCTION OF TRANSMISSION POWER (%) |
|---|---|---|---|
| 5 | 100 | 12.75 | 87.25 |
| 10 | 100 | 12.75 | 87.25 |
| 15 | 100 | 14.349 | 85.651 |
| 20 | 100 | 32.829 | 67.171 |
| 25 | 100 | 72.247 | 27.753 |

INFORMATION PROCESSING APPARATUS AND CONTROL METHOD THEREOF

CROSS-REFERENCE TO RELATED APPLICATION(S)

This application is a continuation application of prior application Ser. No. 14/464,009, filed on Aug. 20, 2014, which claimed the benefit under 35 U.S.C. § 119(a) of a Korean patent application filed on Sep. 2, 2013 in the Korean Intellectual Property Office and assigned Serial number 10-2013-0104980, the entire disclosure of which is hereby incorporated by reference.

TECHNICAL FIELD

The present disclosure relates to an information processing apparatus and a control method thereof for processing data/information through an application, etc. More particularly, the present disclosure relates to an information processing apparatus and a control method thereof configured to minimize power consumption by a communication module performing wireless communication with an external apparatus through unicast or multicast.

BACKGROUND

An information processing apparatus collectively refers to all apparatuses that process data/information through various processes by consuming energy such as electricity, to thereby perform various functions as required by a user. The information processing apparatus is not limited to typical computers, and includes home appliances such as washing machines, refrigerators and dishwashers, set-top boxes, A/V devices such as optical media players and Televisions (TVs), personal computers and mobile devices such as mobile phones and Portable Media Players (PMPs) and other apparatuses of various forms and features to meet user's needs.

In line with the development of technology and increasing user demand, the information processing apparatus may not only operate solely, but also communicate with at least one external apparatus to share and exchange data with the external apparatus. In particular, wired communication is available for communication between two or more apparatuses, but information processing apparatuses such as mobile devices of which portability is important, generally employ wireless communication.

Information processing apparatuses include a wireless communication module for exchanging data with external apparatuses. The wireless communication module transmits data with preset transmission power to thereby simultaneously maximize a transmission range and to enable communication interface with a plurality of external apparatuses within the transmission range. Upon receipt of a signal value from an external apparatus that receives data, the information processing apparatus determines a modulation and coding method suitable for transmission of data, and transmits data based on the received signal value.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an information processing apparatus and a control method thereof for processing data/information through an application.

In accordance with an aspect of the present disclosure, an information processing apparatus is provided. The information processing apparatus includes a communication interface configured to perform a wireless communication with an external apparatus and to transmit data to the external apparatus, and a controller configured to calculate a required bandwidth of a wireless communication as required by at least one application and to adjust a transmission power of the communication interface based on the calculated required bandwidth, when the at least one application is determined to be executed.

In accordance with another aspect of the present disclosure, a control method of an information processing apparatus is provided. The control method includes transmitting, by the information processing apparatus, data to an external apparatus with a predetermined transmission power through a wireless communication, calculating a required bandwidth of the wireless communication as required by at least one application, when the at least one application is determined to be executed by the information processing apparatus, and adjusting the predetermined transmission power based on the calculated required bandwidth and transmitting data to the external apparatus with the adjusted transmission power.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4 illustrates a table showing a Modulation and Coding Scheme (MCS) rate under an IEEE 802.11n network according to an embodiment of the present disclosure;

FIG. 5 illustrates a table showing MCS rate indices corresponding to data rates and reception power based on the table illustrated in FIG. 4 according to an embodiment of the present disclosure;

FIG. 7 illustrates a table showing simulation results according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIGS. 1 through 11, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

Figure 1:
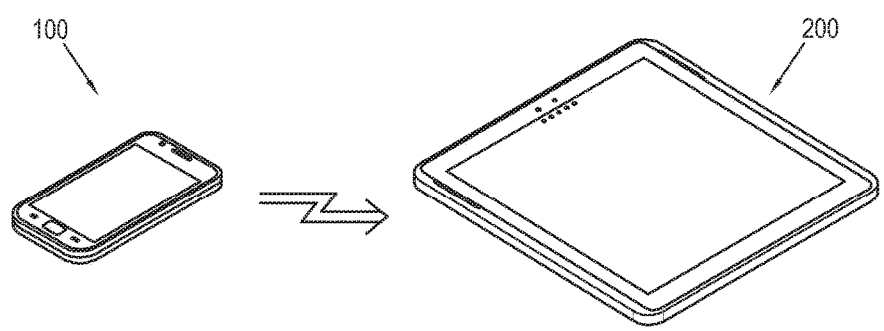
FIG. 1 illustrates an example of an information processing apparatus according to an embodiment of the present disclosure.

FIG. 1 illustrates an example of information processing apparatuses according to an embodiment of the present disclosure.

Referring to FIG. 1, information processing apparatuses 100 and 200 are illustrated, where the information processing apparatuses 100 and 200 are implemented as mobile devices and exchange data wirelessly through mutual wireless communication. In the present embodiment, mutual communication and connection between the two information processing apparatuses 100 and 200 which are implemented as mobile devices are explained, but this is an example, and does not limit the idea of the present disclosure thereto.

The idea of the present disclosure may apply to a case where three or more information processing apparatuses perform wireless communication through multicast as well as to a case where two information processing apparatuses 100 and 200 perform wireless communication through unicast. The idea of the present disclosure may not be limited to a case where the information processing apparatuses 100 and 200 are mobile devices, and at least one of the information processing apparatuses 100 and 200 may be implemented as an electronic apparatus other than the mobile device.

The information processing apparatuses 100 and 200 according to the present embodiment may be classified into a transmitting apparatus 100 that transmits and sends data, and a receiving apparatus 200 that receives data from the transmitting apparatus 100. Such classification is for convenience purpose only in connection with the roles for exchanging data, and the information processing apparatus 200 may transmit data to the information processing apparatus 100, in which case, the idea of the present disclosure may also apply.

Basically, the information processing apparatuses 100 and 200 include a wireless communication module or wireless communication interface (not shown) for wireless communication, and a processor (not shown) to process data and to control the information processing apparatuses 100 and 200. The aforementioned configuration is obvious for the information processing apparatuses 100 and 200, and detailed description will be omitted.

A case where the transmitting apparatus 100 transmits data to the receiving apparatus 200 by using transmission power at a preset level will be considered. Due to the characteristic of a wireless network, transmission power is wasted if data requiring a low bandwidth is transmitted to the receiving apparatus 200 that is within a close distance. If the transmitting apparatus 100 is a mobile device, transmission power waste may be an important issue related to battery consumption of the transmitting apparatus 100. If a level of the transmission power is lowered to reduce transmission power waste by the transmitting apparatus 100, communication quality may be deteriorated depending on a bandwidth of transmission data or a distance of the receiving apparatus 200.

Therefore, the present embodiment offers a method to reduce energy consumption by the transmitting apparatus 100 by controlling transmission power of the transmitting apparatus 100. The present embodiment seeks to minimize transmission power according to an application program executed by the transmitting apparatus 100, i.e., according to a required transmission rate of the application.

The present embodiment is explained based on an IEEE 802.11n network, but the idea of the present disclosure is not limited thereto, and may apply to various network standards.

Figure 2:
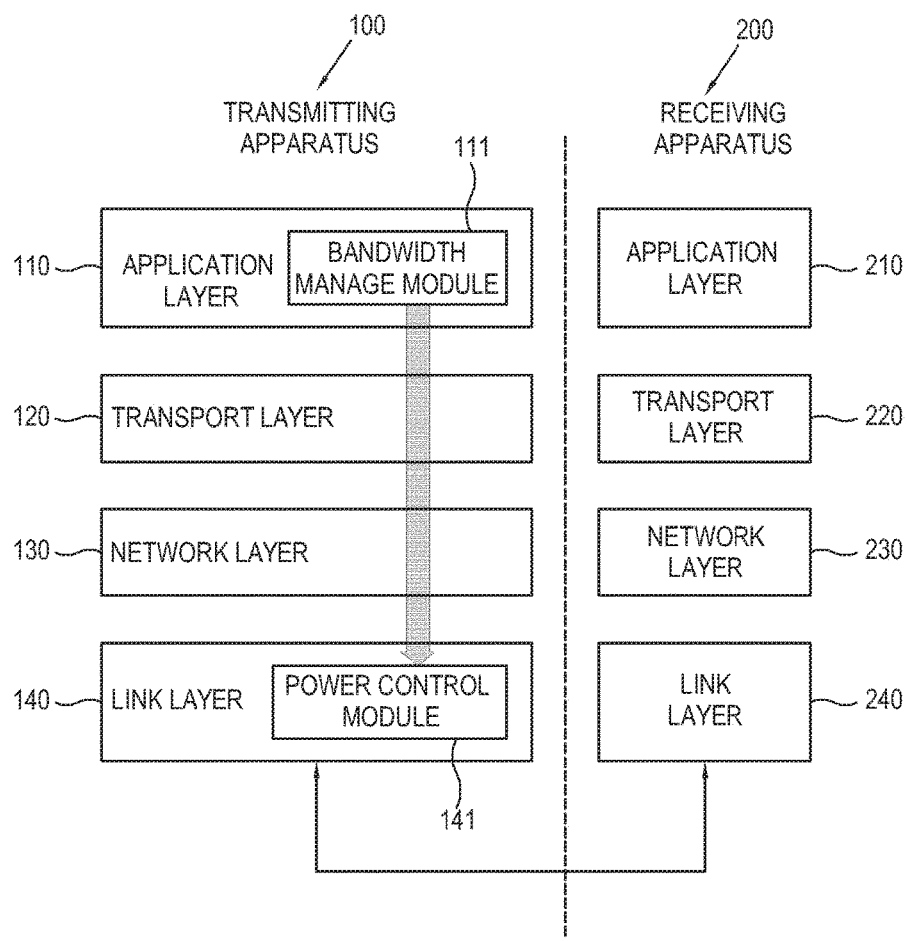
FIG. 2 illustrates an example of a protocol architecture of a transmitting apparatus and a receiving apparatus according to an embodiment of the present disclosure.

FIG. 2 illustrates an example of a protocol architecture of a transmitting apparatus and a receiving apparatus 200 according to an embodiment of the present disclosure.

Referring to FIG. 2, a protocol architecture of a transmitting apparatus 100, which includes an application layer 110, a transport layer 120, a network layer 130 and a link layer 140, based on an Open Systems Interconnection (OSI) model, is illustrated.

Basically, the application layer 110 provides an application to access service of other layers, and defines a protocol that is used to exchange data among applications. Representative protocols include Dynamic Host Configuration Protocol (DHCP), Domain Name System (DNS), File Transfer Protocol (FTP), etc. The transport layer 120 controls messages between a sender and a destination and manages errors, and representative protocols include Transmission Control Protocol (TCP), User Datagram Protocol (UDP), Address Resolution Protocol (ARP), etc. The network layer 130 transmits a packet from a sender to a destination in a multi-network link, and representative protocols include Internet Protocol (IP), Internet Control Message Protocol (ICMP), Internet Group Management Protocol (IGMP), etc. The link layer 140 (e.g., a communication interface) transmits data from the transmitting apparatus 100 to the receiving apparatus 200, and representative protocols include MAC, PPP, etc.

The receiving apparatus 200 also includes an application layer 210, a transport layer 220, a network layer 230 and a link layer 240, which are similar to those of the transmitting apparatus 100.

The application layer 110 of the transmitting apparatus 100 is provided with a bandwidth manage module 111, and the link layer 140 is provided with a power control module 141 (e.g., a controller). Between the application layer 110 and the link layer 140, a cross-layer protocol architecture applies, and the bandwidth manage module 111 may directly transmit predetermined information to the power control module 141 rather than through the transport layer 120 and the network layer 130.

Figure 3:
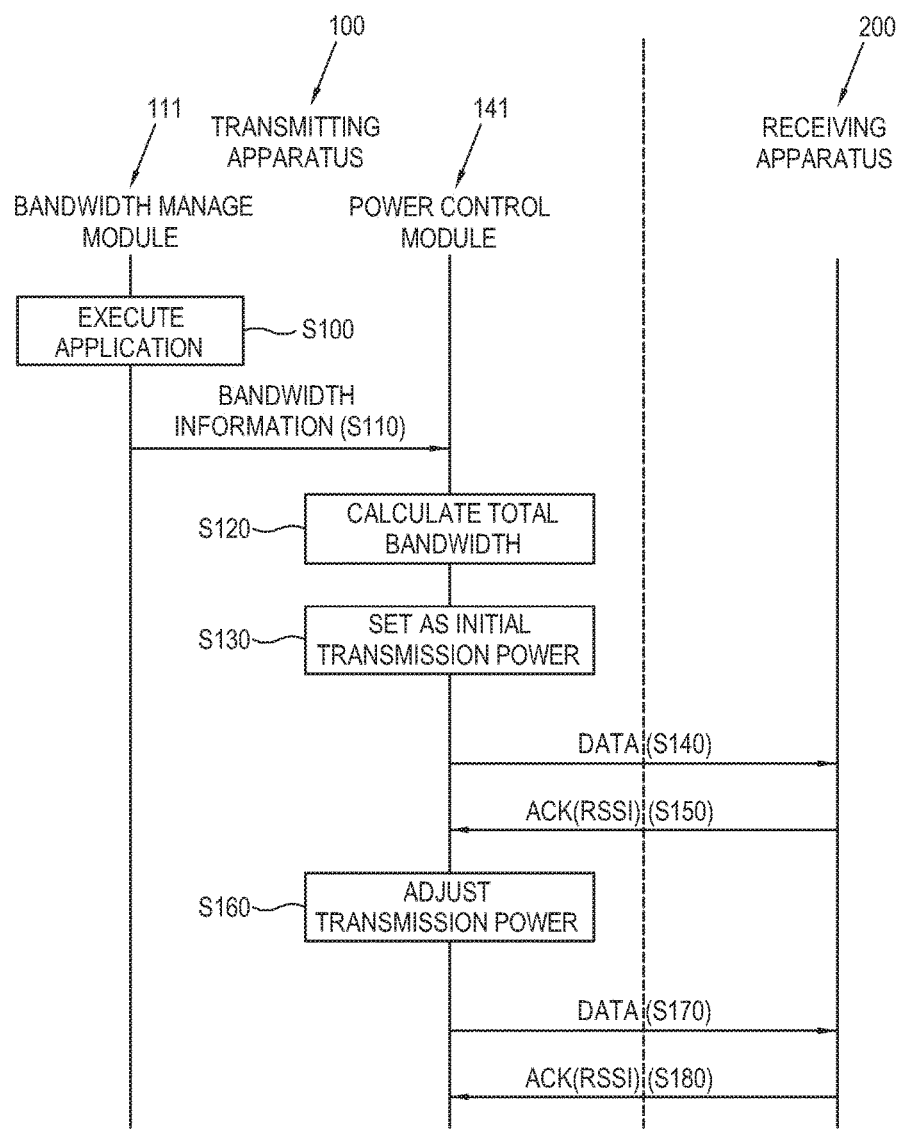
FIG. 3 illustrates an example of an operation process and a data transmission relationship between the transmitting apparatus and the receiving apparatus illustrated in FIG. 2 according to an embodiment of the present disclosure.

FIG. 3 illustrates an operation process and a data transmission relationship between a transmitting apparatus and a receiving apparatus according to an embodiment of the present disclosure.

Referring to FIG. 3, an application, which is executed at operation S100, is illustrated. The application referred to herein may include various applications, software and application programs that are executed in a transmitting apparatus 100.

If at least one application is executed, a bandwidth manage module 111 collects information of a network bandwidth that is required by respective applications. The bandwidth manage module 111 may obtain bandwidth information from an each application that is required by such application.

The bandwidth manage module 111 transmits the collected bandwidth information to a power control module 141 at operation S110.

The power control module 141 calculates a total required bandwidth based on the bandwidth information that has been transmitted by the bandwidth manage module 111 at operation S120.

The power control module 141 sets a data transmission state with predetermined initial transmission power at operation S130. The power control module 141 transmits data to a receiving apparatus 200 with the initial transmission power at operation S140.

The receiving apparatus 200 returns an ACK signal to the transmitting apparatus 100 to notify the reception of data from the transmitting apparatus 100 at operation S150. The ACK signal includes, for example, a RSSI that indicates reception power of the transmitting apparatus 100.

The power control module 141 determines a balance between the transmission power of the transmitting apparatus 100 and reception power of the receiving apparatus 200 based on the total required bandwidth calculated at operation S120 and the RSSI obtained at operation S150, and adjusts the transmission power according to the determination result at operation S160.

The power control module 141 transmits data with the adjusted transmission power at operation S170. The receiving apparatus 200 returns an ACK signal including an RSSI to the transmitting apparatus 100 at operation S180. The power control module 141 repeats the operation S160.

The initial transmission power at the operation S130 may be set as a maximum value of transmission power. Accordingly, in the present embodiment, after the initial transmission power is set as the maximum value, the transmission power is gradually reduced during the performance of the data transmission process. This reduces the transmission power as well as contributing to a normal maintenance of a data transmission performance.

Hereinafter, operations of the bandwidth manage module 111 and the power control module 141 will be described in more detail.

FIG. 4 illustrates a table showing MCS rates according to an IEEE 802.11n network according to an embodiment of the present disclosure.

Referring to FIG. 4, a table provides information for each of an MCS rate index (e.g., 0 . . . 7), a modulation type (e.g., Binary Phase Shift Keying (BPSK), Quadrature Phase Shift Keying (QPSK), 16-Quadrature Amplitude Modulation (16-QAM) and 64-Quadrature Amplitude Modulation (64-QAM)), a coding rate (e.g., as a fractional value), a data rate in Megabits per second (Mbps), and reception power in decibel-milliwatts (dbm).

FIG. 5 illustrates a table showing MCS rate indices corresponding to data rates (e.g., total required data rate) and reception power prepared based on the table illustrated in FIG. 4 according to an embodiment of the present disclosure.

An IEEE 802.11n network has a modulation type and a coding rate designated thereto, and based on the foregoing, a table as illustrated in FIG. 4 may be obtained. In the table, the data rates and reception power may have various values depending on characteristics and usage environment of a transmitting apparatus 100 and a receiving apparatus 200, and are designated in advance to apply to the transmitting apparatus 100.

Based on the table illustrated in FIG. 4, a table as illustrated in FIG. 5 is obtained. The table illustrated in FIG. 5 shows a mapping of a scope of total amount of the required data rate and a scope of reception power and MCS rate indices as integers.

Hereinafter, a method of calculating a total required bandwidth according to the execution of an application will be described.

If bandwidth information is transmitted by a bandwidth manage module 111 according to an execution of an application at operation S110 (refer to FIG. 3), a power control module 141 calculates $B_{rate}$ by Equation 1 below. $B_{rate}$ is a total amount of maximum data rate that is required by at least one application being executed by the transmitting apparatus 100.

$$B_{rate} = \sum_{j=1}^{n} B_j \qquad \text{Equation 1}$$

$B_j$ (Mbps) is a maximum bandwidth required by an application, and the subscript j is a serial number of the application. For example, if five applications are being executed, $B_{rate}$ is calculated by adding up maximum bandwidths required by respective applications.

The table illustrated in FIG. 5 shows MCS rate indices designated corresponding to a scope of $B_{rate}$. The MCS rate indices corresponding to $B_{rate}$ is called $B_{index}$ for purpose of convenience. The power control module 141 converts $B_{rate}$ (Mbps) into $B_{index}$ as an integer with no unit, by referring to the table as illustrated in FIG. 5. For example, if $B_{rate}$ is 20 Mbps, $B_{index}$ indicates 1 as in the table.

The power control module 141 may calculate $B_{total}$ as the final required MCS rate index by Equation 2 below.

$$B_{total} = B_{index} + \alpha \quad \text{Equation 2}$$

$\alpha$ is 0 or higher integer that is a margin value for maintaining sufficient transmission power, and may have various values depending on a design type.

Hereinafter, a method of adjusting transmission power based on the total required bandwidth and RSSI will be described with reference to FIG. 6.

Figure 6:
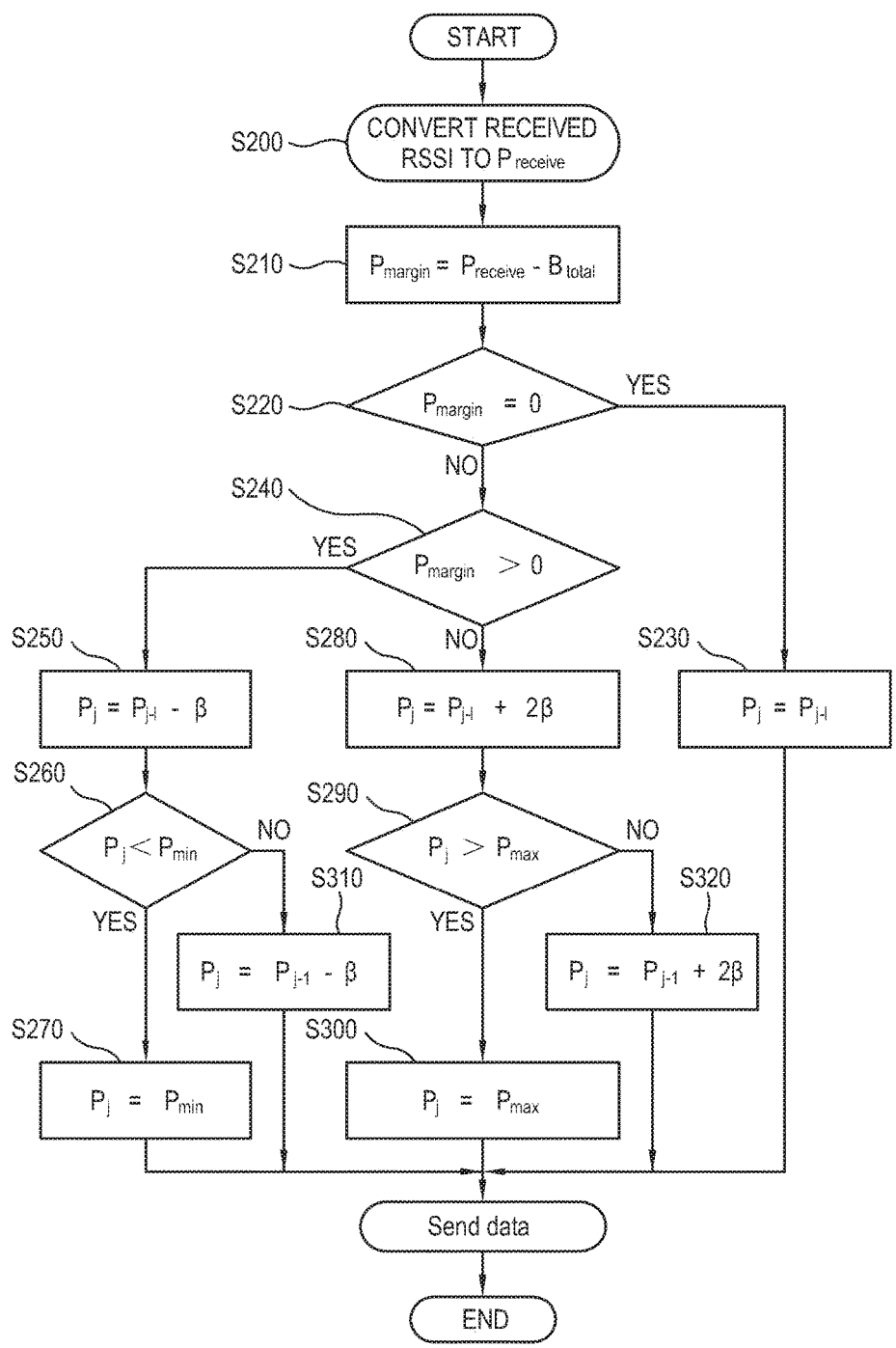
FIG. 6 is a flowchart showing a process of adjusting transmission power by the transmitting apparatus illustrated in FIG. 2 based on a total required bandwidth and RSSI according to an embodiment of the present disclosure.

FIG. 6 is a flowchart showing a process of adjusting transmission power by a transmitting apparatus based on a total required bandwidth and RSSI according to an embodiment of the present disclosure. The process illustrated in FIG. 6 relates to unicast, but also may apply to multicast.

Referring to FIG. 6, if a transmitting apparatus 100 receives an RSSI from a receiving apparatus 200 at operation S150 (refer to FIG. 3), a power control module 141 converts the received RSSI into $P_{receive}$ at operation S200. The power control module 141 converts the RSSI (dbm) into $P_{receive}$ as an integer with no unit, based on the table as illustrated in FIG. 5, according to a principle that is similar to the method of converting $B_{rate}$ into $B_{index}$. For example, if RSSI is −75 dbm, $P_{receive}$ is 1. If the RSSI is −65 dbm, $P_{receive}$ is 4.

The power control module 141 calculates $P_{margin}$ by Equation 3 below at operation S210.

$$P_{margin} = P_{receive} - B_{total} \quad \text{Equation 3}$$

That is, $P_{margin}$ is a value that is calculated by deducting $B_{total}$ from $P_{receive}$.

To enable the transmitting apparatus 100 to transmit data to all receiving apparatuses 200 without loss through multicast, the power control module 141 needs to adjust transmission power in conformity to the minimum reception power of reception power of receiving apparatuses 200. In such case, $P_{receive}$ is calculated by Equation 4 below.

$$P_{receive} = \min_{k} P_{Mk} \quad \text{Equation 4}$$

$P_{Mk}$ is reception power of k number of receiving apparatuses 200. $P_{receive}$ is determined to be a minimum reception power of reception power of the k number of receiving apparatuses 200.

The power control module 141 determines whether $P_{margin}$ is 0 at operation S220.

If yes, it means there is a balance between the transmission power of the transmitting apparatus 100 and the reception power of the receiving apparatus 200. In such case, there is no need to adjust the transmission power. The power control module 141 sets the transmission power as $P_j = P_{j-1}$ at operation S230.

$P_j$ means transmission power at the current data transmission timing if data is sequentially transmitted on a regular basis. $P_{j-1}$ means transmission power that is determined at a data transmission timing prior to one time.

If $P_{margin}$ is not 0, the power control module 141 determines whether $P_{margin}$ is greater than 0 at operation S240.

If $P_{margin}$ is greater than 0, this means that the transmission power of the transmitting apparatus 100 is relatively higher than the reception power of the receiving apparatus 200. That is, it means that transmission power is wasted, and thus, the transmission power should be lowered. The power control module 141 sets the transmission power as $P_j = P_{j-1} - \beta$ at operation S250. $\beta$ is a power increase/decrease parameter that may vary depending on a design type.

The power control module 141 determines whether $P_j$ is less than $P_{min}$ at operation S260. $P_{min}$ is preset minimum transmission power. If $P_j$ is not less than $P_{min}$, the power control module 141 finally determines the transmission power as $P_j = P_{j-1} - \beta$, and transmits data with the finally determined transmission power at operation S310. If $P_j$ is less than $P_{min}$, the power control module 141 finally determines the transmission power as $P_j = P_{min}$ at operation S270.

If $P_{margin}$ is not greater than 0 at operation S240, this means that the transmission power of the transmitting apparatus 100 is relatively less than the reception power of the receiving apparatus 200. That is, it means that data is not normally transmitted, and thus, the transmission power should be raised. The power control module 141 sets the transmission power as $P_j = P_{j-1} + 2\beta$ at operation S280.

If $P_j = P_{j-1} - \beta$ that applies to a case where the transmission power is lowered is compared with $P_j = P_{j-1} + 2\beta$ that applies to a case where the transmission power is raised, the power increase/decrease parameter that is decreased in the former is relatively less than the power increase/decrease parameter that is increased in the latter. This is because raising the transmission power to guarantee a quality communication takes precedence over the decrease in the transmission power to reduce energy consumption. That is, according to the present embodiment, the power control module 141 decreases the transmission power conservatively if it is determined that the transmission power is high, and increases the transmission power aggressively if it is determined that the transmission power is low. Therefore, energy consumption is reduced and a user may be provided with quality communication.

Of course, the power increase/decrease parameter that is increased in the latter needs not be twice the power increase/decrease parameter that is decreased in the former. The power increase/decrease parameter that is increased in the latter may have various values as long as it is greater than the power increase/decrease parameter that is decreased in the former.

Depending on a design type, the power increase/decrease parameter that is decreased in the former may be equal to the power increase/decrease parameter that is increased in the latter, or the power increase/decrease parameter that is decreased in the former may be greater than the power increase/decrease parameter that is increased in the latter.

The power control module 141 determines whether $P_j$ is greater than $P_{max}$ at operation S290. If $P_j$ is not greater than $P_{max}$, the power control module 141 finally determines the transmission power as $P_j = P_{j-1} + 2\beta$, and transmits data with the finally determined transmission power at operation S320. If $P_j$ is greater than $P_{max}$, the power control module 141 finally determines the transmission power as $P_j = P_{max}$ at operation S300.

The method of adjusting $P_j$ as explained above may be summarized by Equation 5 below.

$$P_j = \begin{cases} P_{j-1}, & P_{margin} = 0 \\ P_{j-1} - \beta, & P_{margin} > 0 \\ P_{j-1} + 2\beta, & P_{margin} < 0 \end{cases} \quad \text{Equation 5}$$

If there is a balance between the transmission power and the reception power, the power control module 141 sets $P_j = P_{j-1}$ and does not adjust the transmission power. If the transmission power is relatively higher than the reception power and causes energy waste, the power control module 141 sets $P_j = P_{j-1} - \beta$ to decrease the transmission power. If the transmission power is relatively lower than the reception power and causes a problem in data transmission, the power control module 141 sets $P_j = P_{j-1} + 2\beta$ to increase the transmission power.

By the aforementioned method, the transmitting apparatus 100 may reduce energy consumption.

In the aforementioned embodiment, a case where the total required bandwidth and RSSI of the application are converted into equal figure levels for comparison, but the idea of the present disclosure is not limited thereto. For example, the present disclosure relates to relative comparison, and thus the total required bandwidth and RSSI may employ final values that are calculated by using actual figures.

Hereinafter, simulation results of the embodiment will be described. The results which will be described below show the effect that may be obtained if the idea of the present disclosure applies, and figures and environment of the simulation does not limit the idea of the present disclosure thereto.

Simulation has been performed by 1:1 connection between the transmitting apparatus 100 and the receiving apparatus 200 in Wi-Fi direct, and detailed system environment is as follows:

Carrier frequency: 5.25 GHz;
Channel bandwidth: 40 MHz;
Number of data stream: 1;
Transmission power: 100 mW;
Transmitting antenna gain: 1 dBi;
Receiving antenna gain: 1 dBi;
Guard interval: 400 ns;
Breakpoint: 10 m;
Shadow fading standard deviation before breakpoint distance: 3 dB; and
Shadow fading standard deviation after breakpoint distance: 5 dB.

Under the foregoing environment, 20 Mbps HD image stream is transmitted by the transmitting apparatus 100 to the receiving apparatus 200. $B_{index}$ is 1, α is 2, β is 10 mW, $P_{max}$ is 100 mW and $P_{min}$ is 10 mW.

Figure 8:
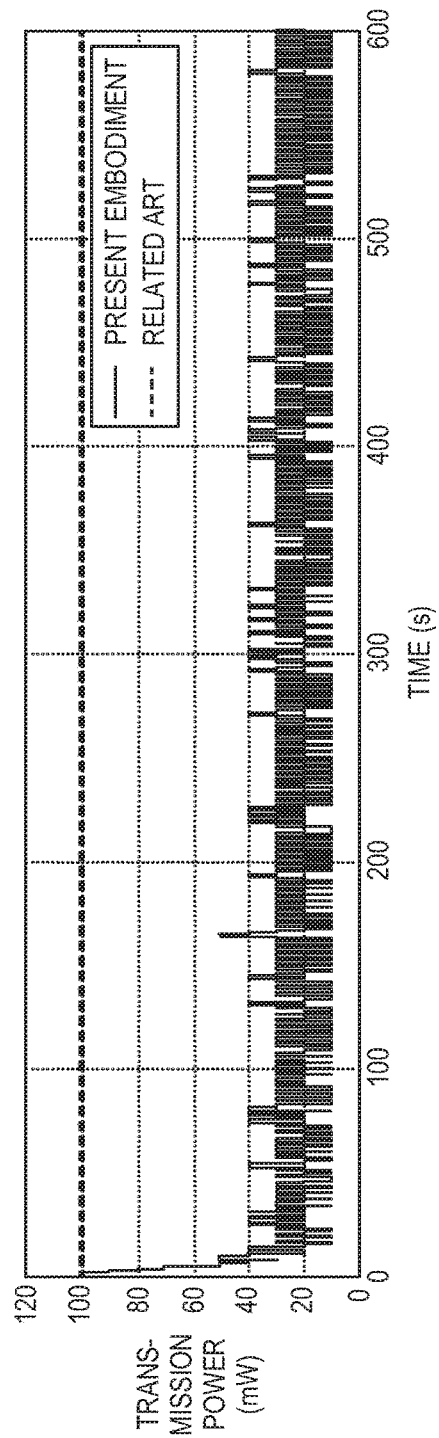
FIG. 8 illustrates a graph showing a degree of increase in transmission power with respect to reception power when a distance between apparatuses is 20 m according to an embodiment of the present disclosure.

FIG. 7 illustrates a table showing simulation results according to an embodiment of the present disclosure. FIG. 8 illustrates a graph showing a degree of improvement of the transmission power with respect to reception power when a distance between apparatuses is 20 m according to an embodiment of the present disclosure. Further, FIG. 9 illustrates a graph showing a degree of improvement of the transmission power with respect to reception power when a distance between apparatuses is 20 m according to an embodiment of the present disclosure.

Referring to FIG. 7, if a distance between a transmitting apparatus 100 and a receiving apparatus 200 is changed to 5 m, 10 m, 15 m, 20 m and 25 m for 1,000 simulations, transmission power was 12.75, 12.75, 14.35, 32.83 and 72.25, respectively. Given that transmission power of a related art is fixed to 100 mW, power reduction of 87.25% was obtained if the distance between the transmitting apparatus 100 and the receiving apparatus 200 was 10 m.

Referring to FIG. 8, if a distance between two apparatuses is, e.g., 20 m, transmission power was ranged between approximately 20 to 30 mW over time. Therefore, energy consumption according to the present disclosure is far less than the fixed transmission power of 100 mW of the prior art.

Figure 9:
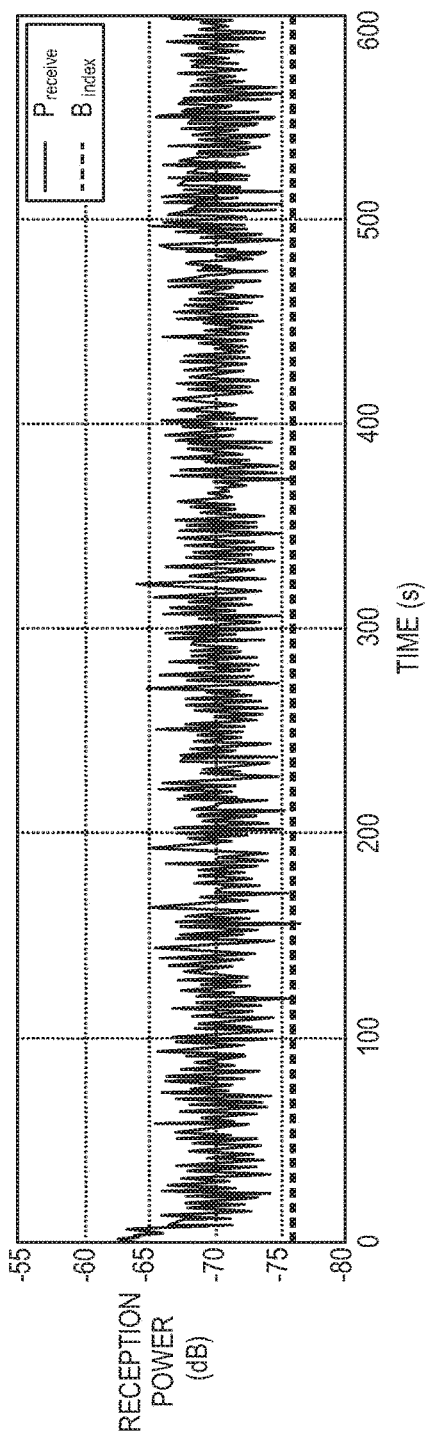
FIG. 9 illustrates a graph showing a degree of increase in transmission power with respect to reception power when a distance between apparatuses is 20 m according to an embodiment of the present disclosure.

Referring to FIG. 9, $P_{receive}$ is always higher than $B_{index}$. This means that even if the transmission power is adjusted according to the present embodiment, the adjusted transmission power is sufficient to transmit data normally.

Figure 10:
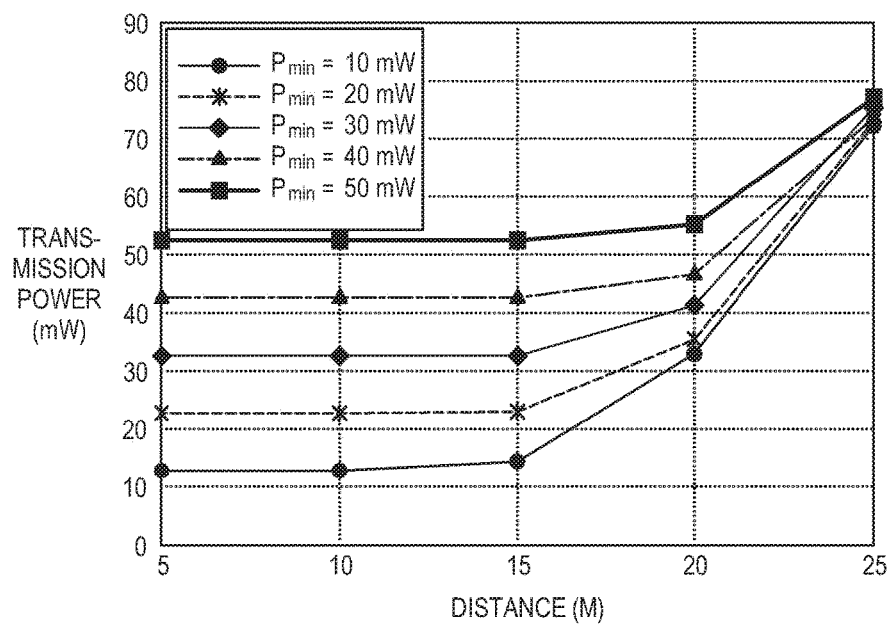
FIG. 10 illustrates a graph showing a relationship between transmission power and a distance depending on minimum transmission power in a simulation according to an embodiment of the present disclosure.
Figure 11:
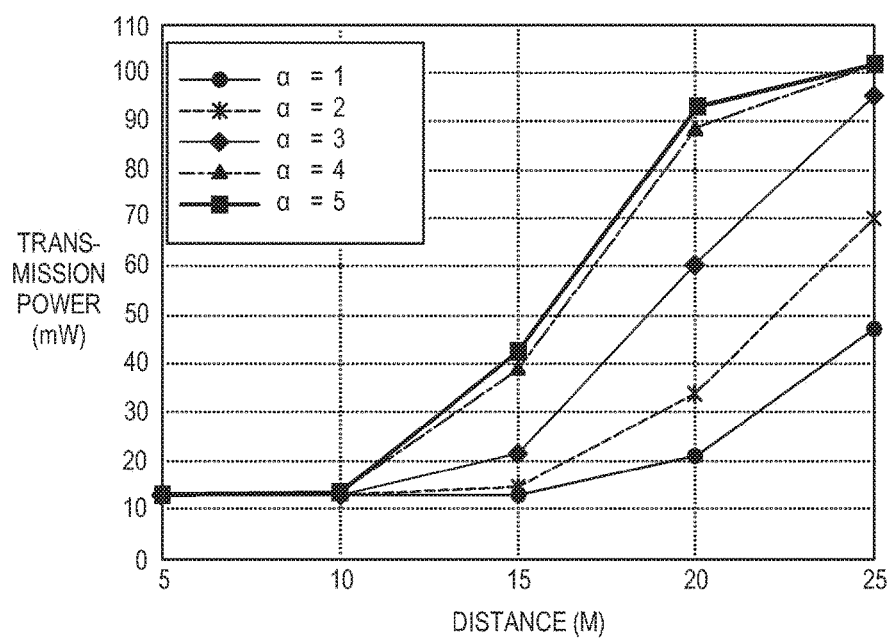
FIG. 11 illustrates a graph showing a relationship between transmission power and a distance depending on a margin value of transmission power in a simulation according to an embodiment of the present disclosure.

FIG. 10 illustrates a graph showing a relationship between transmission power and distance according to minimum transmission power according to an embodiment of the present disclosure. FIG. 11 illustrates a graph showing a relationship between transmission power and distance according to a margin value of transmission power according to an embodiment of the present disclosure.

Referring to FIG. 10, the lower $P_{min}$ is, the less the transmission power is within a short distance of 15 m or less. Within a long distance of 20 m or more, data transmission consumes more power due to distance, and transmission power is relatively high. As above, the present embodiment has great effect for a short distance wireless communication of 15 m or less.

Referring to FIG. 11, in case of a relationship between the transmission power and the distance when $P_{min}$ is 10 and α changes to 1, 2, 3, 4 and 5, the transmission power is low if α is small. And if α is large, the transmission power is high. Regardless of the figure of α, the transmission power is low within a short distance of 15 m or less.

As described above, when 20 Mbps HD image stream is transmitted by 1:1 connection according to the present embodiment, the transmission power is reduced by 87.25% if $P_{min}$ is 10 and the distance between the apparatuses is 5 m. Despite such reduction of the transmission power, data transmission performance is not affected.

According to the present embodiment, energy consumption of the transmitting apparatus 100 may be reduced even under high quality wireless communication environment.

As described above, the information processing apparatus according to the embodiment transmits data to an external apparatus with predetermined transmission power through wireless communication. If at least one application is executed, the information processing apparatus calculates the total required bandwidth of the wireless communication as required by the application, and adjusts the transmission power based on the calculated total required bandwidth.

The information processing apparatus receives the RSSI from an external apparatus, compares the RSSI with the total required bandwidth, and adjusts the transmission power according to the comparison result.

According to the embodiment, battery consumption by the transmitting apparatus may be reduced, compared to the prior art which has fixed transmission power.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An information processing apparatus comprising:
    a communication interface configured to transmit a wireless communication signal including data to an external apparatus; and
    a processor configured to:
        determine a required bandwidth of the wireless communication signal,
        receive a received signal strength indication (RSSI) value indicating a reception power of the external apparatus from the external apparatus, and
        adjust a transmission power of the wireless communication signal based on the required bandwidth and the received RSSI value.

2. The information processing apparatus of claim 1, wherein the processor is further configured to adjust the transmission power of the wireless communication signal according to a comparison result of the required bandwidth and the received RSSI value, and
    wherein a bandwidth-RSSI value matching table is used to compare the required bandwidth and the received RSSI value.

3. The information processing apparatus of claim 1, wherein the processor is further configured to convert the required bandwidth and the received RSSI into actual figures or into identical figure levels to compare the required bandwidth and the received RSSI.

4. The information processing apparatus of claim 3, wherein the identical figure levels are integers without units.

5. The information processing apparatus of claim 1, wherein the processor is further configured to:
    select a minimum RSSI from RSSIs of a plurality of external apparatuses, and
    compare the minimum RSSI with the required bandwidth, when the communication interface transmits the wireless communication signal using multicast.

6. The information processing apparatus of claim 1, wherein the processor is further configured to:
    when the required bandwidth is determined to be higher than the received RSSI, decrease the transmission power by decreasing a current transmission power by a preset decrease value, and
    when the received RSSI is determined to be higher than the required bandwidth, increase the transmission power by increasing the current transmission power by a preset increase value.

7. The information processing apparatus of claim 6, wherein the processor is further configured to:
    when the required bandwidth is determined to be higher than the received RSSI, compare the decreased transmission power with a preset minimum transmission power,
    when the decreased transmission power is less than the preset minimum transmission power, transmit data with the preset minimum transmission power, and
    when the decreased transmission power is not less than the preset minimum transmission power, transmit data with the decreased transmission power.

8. The information processing apparatus of claim 6, wherein the processor is further configured to:
    when the received RSSI is determined to be higher than the required bandwidth, compare the increased transmission power with a preset maximum transmission power,
    when the increased transmission power is greater than the preset maximum transmission power, transmit data with the preset maximum transmission power, and
    when the increased transmission power is not greater than the preset maximum transmission power, transmit data with the increased transmission power.

9. The information processing apparatus of claim 6, wherein the preset increase value and the preset decrease value are set in advance.

10. The information processing apparatus of claim 1, wherein the processor is further configured to:
    transmit data to the external apparatus with a maximum transmission power that is set in advance when initially calculating the required bandwidth, and
    compare the received RSSI provided by the external apparatus with the required bandwidth corresponding to the transmission of the data.

11. A control method of an information processing apparatus, the control method comprising:
    determining a required bandwidth of the wireless communication signal;
    transmitting, by the information processing apparatus, a wireless communication signal including data to an external apparatus through a wireless communication;
    receiving a received signal strength indication (RSSI) value indicating a reception power of the external apparatus from the external apparatus;
    adjusting a transmission power of the wireless communication signal based on the required bandwidth and the received bandwidth; and
    transmitting data to the external apparatus with the adjusted transmission power.

12. The control method of claim 11,
wherein the adjusting of the transmission power comprises adjusting the transmission power of the wireless communication signal according to a comparison result of the required bandwidth and the received RSSI value,
wherein a bandwidth-RSSI value matching table is used to compare the required bandwidth and the received RSSI value.

13. The control method of claim 11, wherein the adjusting of the transmission power comprises converting the required bandwidth and the received RSSI into identical figure levels for comparison.

14. The control method of claim 13, wherein the identical figure levels comprise integers without units or actually measured values.

15. The control method of claim 11, wherein the adjusting of the transmission power comprises, when transmitting the wireless communication signal using multicast, selecting a minimum RSSI from RSSIs of external apparatuses and comparing the minimum RSSI with the required bandwidth.

16. The control method of claim 11, wherein the adjusting of the transmission power comprises:
 decreasing the transmission power by decreasing a current transmission power by a preset decrease value, when the required bandwidth is determined to be higher than the received RSSI; and
 increasing the transmission power by increasing the current transmission power by a preset increase value, when the received RSSI is determined to be higher than the required bandwidth.

17. The control method of claim 16, wherein the decreasing of the transmission power comprises:
 comparing the decreased transmission power with a preset minimum transmission power, when the required bandwidth is determined to be higher than the received RSSI;
 transmitting data with the preset minimum transmission power, when the decreased transmission power is less than the preset minimum transmission power; and
 transmitting data with the decreased transmission power, when the decreased transmission power is not less than the preset minimum transmission power.

18. The control method of claim 16, wherein the increasing of the transmission power comprises:
 comparing the increased transmission power with a preset maximum transmission power, when the received RSSI is determined to be higher than the required bandwidth;
 transmitting data with the preset maximum transmission power, when the increased transmission power is greater than the preset maximum transmission power; and
 transmitting data with the increased transmission power, when the increased transmission power is not greater than the preset maximum transmission power.

19. The control method of claim 16, wherein the preset increase value and the preset decrease value are set in advance.

20. The control method of claim 11, further comprising:
 transmitting data to the external apparatus with a maximum transmission power that is set in advance when initially calculating the required bandwidth, and
 comparing the received RSSI with the required bandwidth corresponding to the transmission of the data.

* * * * *